United States Patent [19]

Canadas

[11] Patent Number: 4,685,723
[45] Date of Patent: Aug. 11, 1987

[54] SUN VISOR FOR A MOTOR VEHICLE

[75] Inventor: Jean Christophe Canadas, Remiremont, France

[73] Assignee: Compagnie Industrielle de Mecanismes en abrege C.I.M., France

[21] Appl. No.: 843,527

[22] Filed: Mar. 25, 1986

[30] Foreign Application Priority Data

Mar. 25, 1985 [FR] France .................. 85 04427

[51] Int. Cl.4 .............................................. B60J 3/00
[52] U.S. Cl. ................................................ 296/97 H
[58] Field of Search ........................... 296/97 H, 97 R; 350/606

[56] References Cited

U.S. PATENT DOCUMENTS 4,068,930 1/1978 Marcus ......................... 296/97 R
4,275,916 6/1981 Skogler ........................ 296/97 H
4,494,789 1/1985 Flowerday .................... 296/97 H Primary Examiner—Robert R. Song

[57] ABSTRACT

A sun visor for a motor vehicle comprising a shield (1) covered with a covering (2) of plastics material and provided with a mirror (3) fixed in a cavity (4) provided in the shield. The mirror (3) is disposed in a detachable support (6) which is capable of being fixed in the cavity (4) by clipping, the support (6) in which the mirror (3) is slidable, being provided for this purpose with tabs (12) which are capable of elastically clipping into corresponding openings (16) provided in a metal insert (7) placed in the bottom of the cavity (4) and covered with the sheet of PVC. This manner of securing the mirror (3) is cheaper and more aesthetic than known constructions.

8 Claims, 5 Drawing Figures

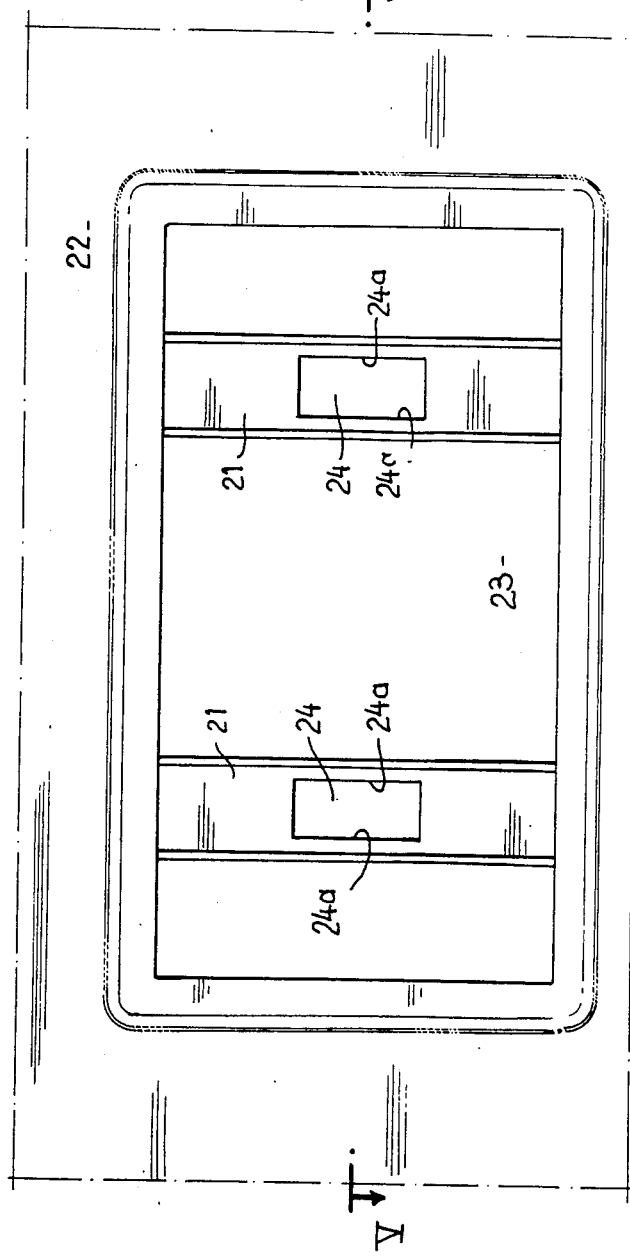

SUN VISOR FOR A MOTOR VEHICLE

The present invention relates to a sun visor for motor vehicles comprising a shield covered with a covering of plastics material and provided with a mirror fixed in a cavity provided in the shield, the covering being, for example, composed of polyvinyl chloride (PVC).

In present sun visors, the mirror is usually fixed to the covering of PVC by means of a metal or plastics frame which is itself maintained in position by a rigid PVC plate welded to the covering PVC. After positioning of the mirror, the tabs of the frame are bent over.

This device is expensive owing to the fact that it requires considerable labour, intermediate stocks and handlings.

Further, it is not satisfactory in respect of the increasingly severe new standards of quality since it gives rise to the following problems:

poor temperature behaviour, deformation of the PVC beyond 75° C. while motor vehicle constructors at present require 125° C. without deformation;

noise of the mirror in its cavity;

defect in the covering of PVC due to the marking of the corners of the frame.

An object of the invention is to overcome these drawbacks.

The invention provides a sun visor wherein the mirror is disposed in a detachable support which may be fixed in the cavity by clipping on retaining means connected to the shield.

In one embodiment of the invention, the support is formed by a reinforcement in which the mirror may be slid, and this reinforcement is provided with tabs capable of being engaged in retaining means so as to clip therein elastically by hooking on the edges of at least one opening formed in the latter.

According to a particular embodiment, the retaining means are formed by a rigid insert which is preferably of metal and covered with a film of plastics foam constituting the shield and provided with at least one opening on the opposite edges of which the elastic tabs of the support of the mirror can be clipped through the thickness of the plastics covering of the shield.

The positioning of the mirror which has previously been slid into its support reinforcement is very simple and rapid, and this considerably reduces the required labour.

Further features and advantages of the invention will be apparent from the following description, with reference to the accompanying drawings, which illustrate two embodiments thereof by way of non-limiting examples:

FIG. 4 is a top plan view of the means for retaining the mirror and its support formed in a sun visor according to a second embodiment of the invention, and FIG. 5 is a longitudinal sectional view taken on line V—V of FIG. 4, of a mirror disposed in a corresponding support.

Figure 1:
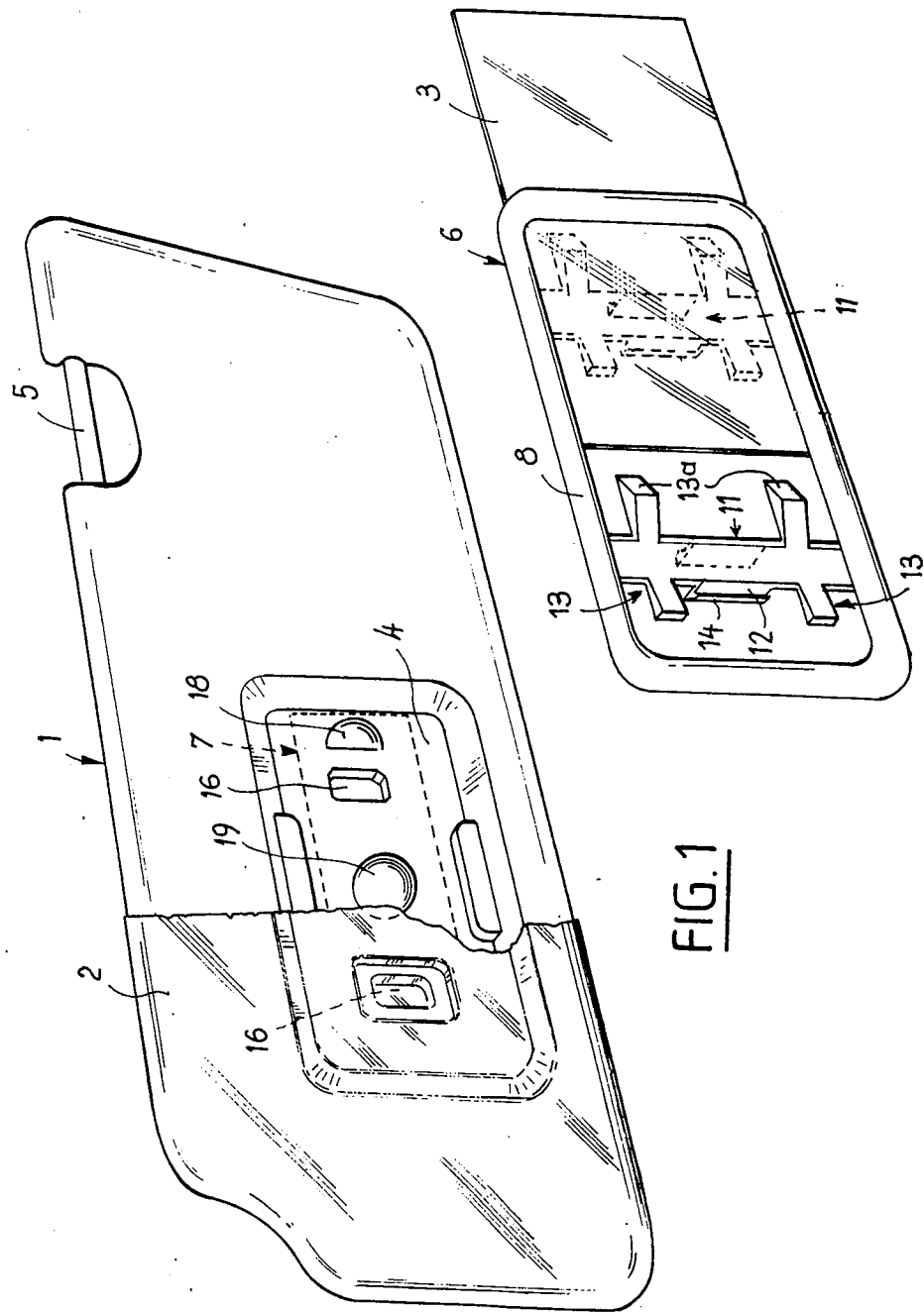
FIG. 1 is an exploded perspective view, with a part cut away, of a first embodiment of the sun visor according to the invention and of its mirror which is partly engaged in its support.
Figure 2:
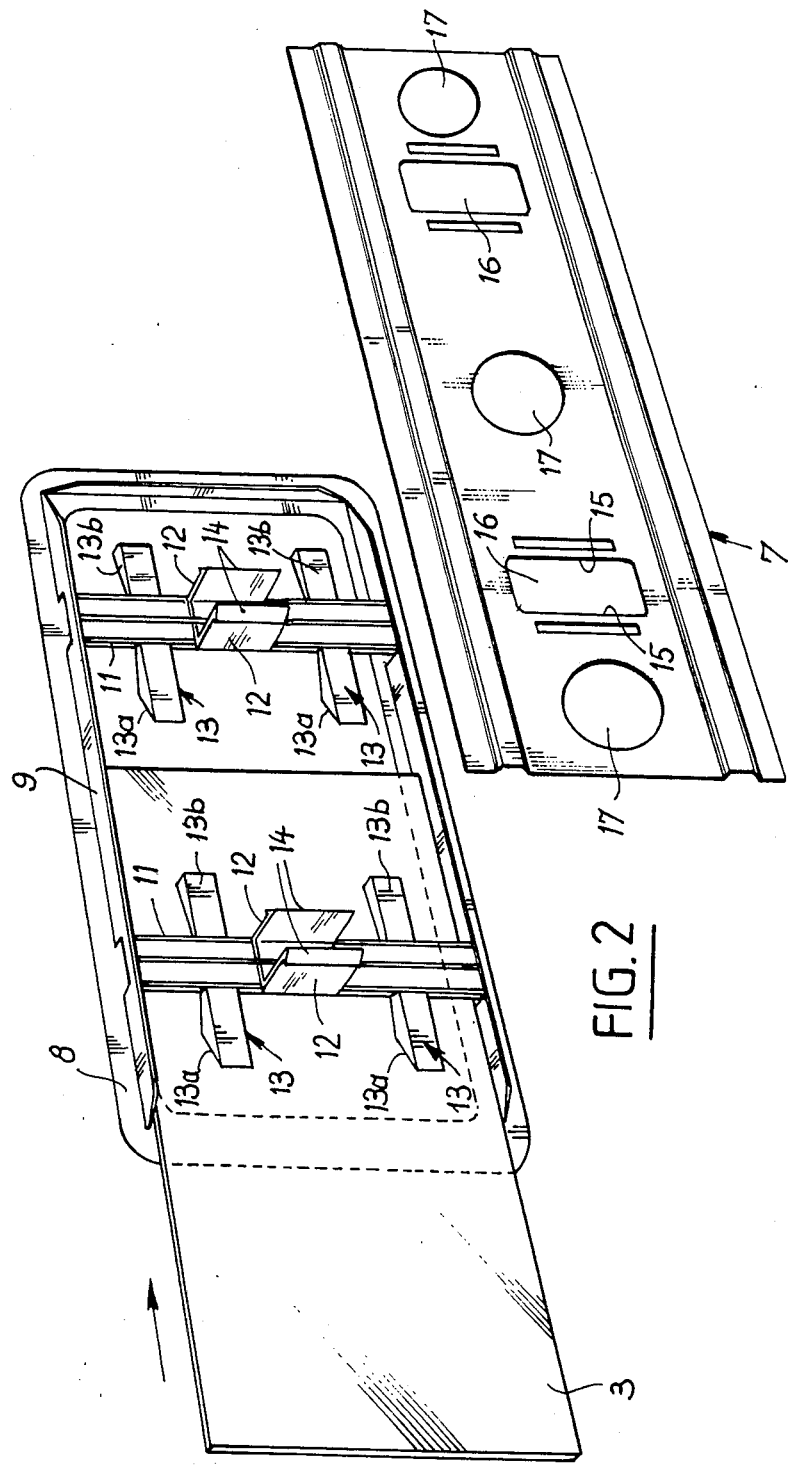
FIG. 2 is a perspective view to an enlarged scale relative to FIG. 1, of the support reinforcement of the mirror and of a metal insert provided for disposing in the cavity of the sun visor for retaining the support reinforcement of the mirror by clipping.
Figure 3:
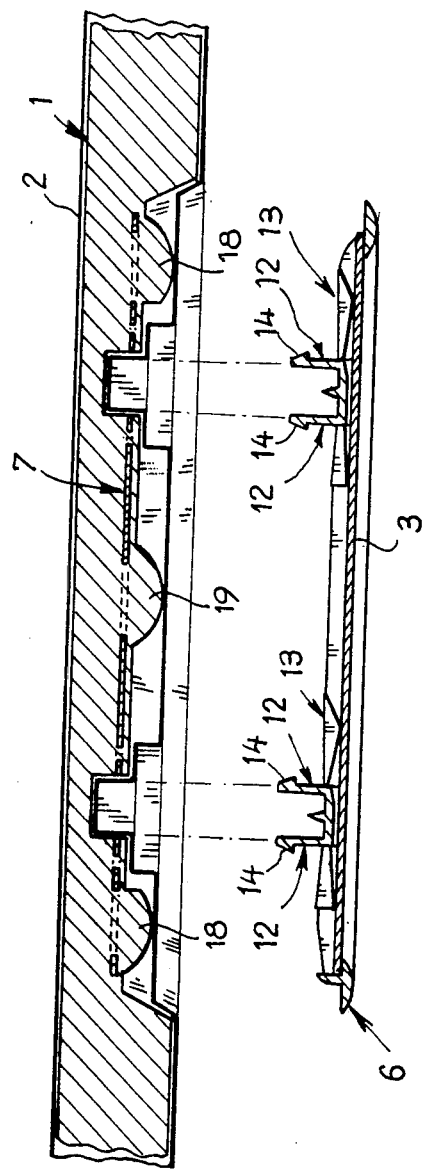
FIG. 3 is a longitudinal sectional view, with parts cut away, of the sun visor of FIGS. 1 and 2 and of the support reinforcement of the mirror.

The sun visor shown in FIGS. 1 to 3 is intended for motor vehicles and it comprises a shield 1 preferably made from injected foam covered with a covering 2 of a suitable plastics material, such as a sheet of polyvinyl chloride (PVC), and provided with a mirror 3 fixed in a cavity 4 provided in the shield 1.

A rod 5 having both end portions embedded in the shield 1 enables the sun visor to be pivotally connected to the roof of the vehicle.

The mirror 3 is disposed in a detachable support 6 which can be fixed in the cavity 4 by clipping onto retaining means 7 rigid with the shield 1. In this embodiment, the support 6 is formed by a reinforcement whose periphery matches the contour of the mirror 3, which is rectangular in the presently-described embodiment and may be slid into the reinforcement 6. The latter therefore comprises a peripheral edge 8 which matches the contour of the mirror 3 and a rib 9 which is perpendicular to the edge 8 and extends throughout the periphery of the latter, except for a small side to which corresponds therefore an opening (FIG. 2) allowing the introduction of the mirror 3 in the reinforcement 6. The large sides of the edge 8 are connected by two transverse bars 11, each of which is provided with a pair of tabs 12 which extend in a direction perpendicular to the general plane of the bars 11 and the edge 8, and a pair of longitudinal strips 13 which are parallel to each other and extend substantially in the same plane as the edge 8 and the bars 11.

Bevels 13a are provided on the ends of the strips 13 facing toward the inserting opening of the mirror 3 so that the mirror 3 can slide on the bevelled ends 13a when it is introduced in the reinforcement 6, between the inner periphery of the edge 8 on which it is maintained in bearing relation by the strips 13. The latter also include for this purpose end portions 13b provided on the other side of the bars 11 to the bevels 13a.

The two pairs of tabs 12 are provided at their ends with bevelled projections 14 whereby it is possible to clip the tabs 12, by the elastic separation of the latter, onto the opposite edges 15 of two openings 16 each formed in facing relation to a pair of tabs 12 in a rigid insert constituting the aforementioned means 7 for retaining the support 6 and the mirror 3.

The insert 7 is preferably of metal and provided, in the presently-described embodiment, with three circular openings 17 through which are adapted to extend bosses 18, 19 (FIG. 1) of injected foam acting as supports for the mirror 3.

During the manufacture of the shield 1 by injection of foam, the metal insert 7 is placed in the bottom of the cavity 4 and covered with a film of foam, then, with the whole of the shield 1, it is covered with the covering 2 of PVC. The mirror 3 is slid into the reinforcement 6 between the strips 13 and the edge 8 against which it is applied. Thereafter, it is merely necessary to clip the tabs 12 by their projections 14 onto the opposite edges 15 of the openings 16, the inclined surfaces of the projections 14 sliding on these edges, while the tabs 12 move toward each other and then elastically move apart and grip the insert 7 through the sheet 2.

The mirror 3 is then in position.

The reinforcing support 6 is made from a plastics material having a good behaviour with respect to temperature, for example from six/six polyamide with a glass filler which resists temperatures which may exceed 105° C.

The simplicity of the mounting of the mirror 3 and its support 6 results in a considerable saving in labour and therefore reduces the cost of constructing the sun visor. Further, the use of a support 6 made in a single piece from a suitable plastics material, such as that mentioned hereinbefore, improves the behaviour of the sun visor fixing system as concerns temperature. The strength of this fastening also constitutes an improvement over the prior art in the same way as the aesthetic appearance of the mirror 3 only the frame, constituted by the outer side of the periphery edge 8 being visible when the assembly 3,6 has been placed in position.

In the second embodiment of the sun visor illustrated in FIGS. 4 and 5, the means for retaining the reinforcement 6 are formed by two plates 21 which are in one piece with a semi-shell 22 constituting one half of the shield of the sun visor according to French Pat. Np. 81 18233 of the Applicant, this half-shell being made, for example, from polypropylene.

The two bars 21 extend transversely in a cavity 23 of the semi-shell 22 and are each provided with an opening 24 on the opposite edges 24a of which are capable of clipping the two pairs of elastic tabs 12 (FIG. 5).

The manner of assembling is the same as in the first embodiment, and the inner periphery of the peripheral edge 8 bears against the corresponding periphery of the cavity 23.

By way of a modification, it would be possible to provide only a single pair of tabs 12 for clipping to the reinforcement 6, and a single corresponding opening 16 or 24, provided that these tabs and the edges of the associated opening are of course sufficiently spaced apart to ensure a suitable fastening of the mirror 3. In the embodiment shown in FIGS. 4 and 5, the two transverse plates 21 would therefore be replaced by a single plate provided with an opening of sufficient width.

What is claimed is:

1. In a sun visor fitted with a mirror for a motor vehicle that improvement consisting of
   a shield having a cavity;
   a covering of plastic material covering said shield;
   a mirror slidably mounted in the cavity of said shield; and
   means for fixing the mirror in the cavity comprising a detachable support having a reinforcement whose periphery matches the contour of the mirror on which the mirror is slidably mounted and on which the mirror can be fixed in said cavity, retaining means defining at least one opening, tabs on said reinforcement which are capable of engaging in the retaining means to elastically clip thereon by hooking on the edges of said opening in the retaining means.

2. A sun visor according to claim 1, wherein the retaining means comprise a rigid insert and a film of plastics foam constituting the shield and covering the insert, the insert defining said at least one opening on opposite edges of which opening the tabs of the reinforcement are capable of clipping through the thickness of the plastics covering of the shield.

3. A sun visor according to claim 1, wherein the retaining means comprise at least one plate in one piece with the shield and defining said at least one opening on the opposite edges of which the tabs of the reinforcement are capable of clipping.

4. A sun visor according to claim 3, comprising two of said plates, each defining a respective opening for engagement with the tabs of the reinforcement.

5. A sun visor according to claim 3, said plate being part of a semi-shell of polypropylene constituting one half of the shield.

6. A sun visor according to claim 1, wherein the support of the mirror comprises a peripheral edge portion matching the contour of the mirror, transverse bars carrying said tabs, and bevelled strips carried by the transverse bars, said edge portion and the strips being adapted in such manner that the mirror can be introduced therebetween in sliding under the bevels of the strips which are operative to maintain the mirror applied against said edge portion.

7. A sun visor according to claim 1, wherein the support is made from a material resisting temperatures which may exceed 105° C.

8. A sun visor according to claim 7, wherein the material of the support is six/six polyamide with a glass filler.

* * * * *